United States Patent
Tietjen et al.

[11] Patent Number: 5,872,992
[45] Date of Patent: Feb. 16, 1999

[54] SYSTEM AND METHOD FOR AVOIDING BUS CONTENTION ON A MULTIPLEXED BUS BY PROVIDING A TIME PERIOD SUBSEQUENT TO A READ OPERATION

[75] Inventors: Donald L. Tietjen; David M. Menard, both of Austin, Tex.

[73] Assignee: Motorola, Inc., Schaumburg, Ill.

[21] Appl. No.: 519,030

[22] Filed: Aug. 24, 1995

[51] Int. Cl.⁶ .................................................. G06F 13/00
[52] U.S. Cl. ........................... 395/800.28; 395/800.29; 395/800.3; 395/800.42
[58] Field of Search ................................. 395/800, 800.1, 395/800.33, 800.28, 800.29, 800.3, 800.42; 364/DIG. 1

[56] References Cited

U.S. PATENT DOCUMENTS

| | | | |
|---|---|---|---|
| 3,737,637 | 6/1973 | Frankeny et al. | 235/153 A |
| 4,050,096 | 9/1977 | Bennett et al. | 364/200 |
| 4,779,089 | 10/1988 | Thues et al. | 340/825.5 |
| 4,788,660 | 11/1988 | Arizono | 364/200 |
| 4,816,996 | 3/1989 | Hill et al. | 364/200 |
| 4,884,234 | 11/1989 | Keys et al. | 364/900 |
| 4,958,277 | 9/1990 | Hill et al. | 364/200 |
| 4,992,956 | 2/1991 | Kaku et al. | 364/519 |
| 5,151,986 | 9/1992 | Langan et al. | 395/550 |
| 5,179,706 | 1/1993 | Swanson et al. | 395/725 |
| 5,261,073 | 11/1993 | Mann | 395/425 |
| 5,392,436 | 2/1995 | James et al. | 395/725 |
| 5,448,703 | 9/1995 | Amini et al. | 395/290 |

OTHER PUBLICATIONS

Motorola MC68332 User's Manual, 4.3 "Chip–Select Submodule", published 1990, pp. 4–27 thru 4–46.

*Primary Examiner*—Larry D. Donaghue
*Assistant Examiner*—Dzung C. Nguyen

[57] ABSTRACT

A bus interface unit within a processor ensures a delay period after the occurrence of a read operation to avoid bus contention on a multiplexed bus, When there is a requirement for a back-to-back read or write operation subsequent to the read bus cycle on a multiplexed bus it is important to allow devices, such as memory, sufficient time to reset after transmission of data. To avoid the bus contention problem that occurs after a read bus cycle, i.e, prevent a next address on the bus until the bus is in a tri-state condition, one embodiment inserts idle clock cycles subsequent to a read but not subsequent to a write, The present invention avoids bus contention on a multiplexed bus while providing flexibility in interfacing with a variety of memory devices, and providing a flexible processor design.

15 Claims, 4 Drawing Sheets

SYSTEM AND METHOD FOR AVOIDING BUS CONTENTION ON A MULTIPLEXED BUS BY PROVIDING A TIME PERIOD SUBSEQUENT TO A READ OPERATION

REFERENCE TO RELATED APPLICATION

The present application is related to the following U.S. patent application:

"Method and Apparatus for Performing Multiplexed and Non-Multiplexed Bus Cycles in a Data Processing System", invented by Oded Yishay et al., having Ser. No. 08/158,584, filed Nov. 29, 1993, and assigned to the assignee hereof.

FIELD OF THE INVENTION

The present invention relates in general to data processing systems, and in particular, to a system and method for relieving bus contention problems on a multiplexed bus.

BACKGROUND OF THE INVENTION

A bus is a set of hardware lines used for data transfer among the components of a computer system. A bus is essentially a shared highway that connects different parts of the system—including the microprocessor, memory, and input/output ("I/O") ports—and enables them to transfer information. Typical buses have been designed so that one group of lines carries data while another carries the addresses where specific data can be found, and yet other lines carry control signals to insure that the different parts of the system use the bus without conflict. In contrast to this configuration, some computer systems utilize a multiplexed bus wherein the same lines of the bus carry both address and data information in a time domain multiplexed arrangement (i.e., address and data information are sent at different intervals).

A data processing system utilizing a multiplexed bus may encounter bus contention problems, wherein two different devices coupled to the bus, such as the microprocessor ("CPU") and an external memory, may simultaneously attempt to utilize the multiplexed bus (e.g., the CPU and the memory may both be attempting to transmit address and/or data information onto the multiplexed bus). Such a bus contention problem may readily occur after a read bus cycle. (A bus cycle is defined herein as the amount of time required for an "operation," such as the transfer of data during a read or write operation. "Read bus cycle" and "write bus cycle" are sometimes referred to herein as "read cycle" and "write cycle," respectively.) During a typical read bus cycle, the CPU has first transmitted the address of the data to be read from an external device (e.g., such as an external memory or an I/O module) to that same device. In response to receipt of this address, the memory or I/O module will then retrieve the requested data and drive the data to the CPU via the multiplexed bus. After completion of the transmission of the data, the memory or I/O module must tri-state the data bus conductors subsequent to the data phase of the cycle before the next address phase can begin (i.e., the memory device or I/O module must deselect, or release, the bus so that the CPU can utilize it to drive the next address). Note that the terms "tri-state" and "high impedance" will be used interchangeably herein to describe one or more bus conductors (lines) that have been placed in a high impedance state.

The foregoing problem is a result of external memories and I/O modules requiring long, and sometimes indeterminable, periods for deselecting the bus after transmitting read data onto the bus. The result is that the bus interface unit on the CPU is uncertain as to when it may drive another address onto the bus. This problem is exacerbated when the designers of the CPU are not aware of the type and/or manufacturer of the memory and/or I/O modules to be coupled to the CPU via the bus. In other words, it may be desirous to completely design the CPU and its resident bus interface unit without requiring knowledge of tri-state periods required by devices to be coupled to the CPU at a later time.

The prior art has dealt with the foregoing problem in several ways. One solution that has been implemented in previous systems is to drive the next address after a read cycle on the falling edge of the clock cycle ("clock cycle" and "clock" both refer to one clock cycle herein) subsequent to the read cycle. However, this solution is essentially inadequate and unreliable for bus frequencies above 20 MHz, since the half clock cycle may not be enough time for the bus device to deselect the bus and tri-state.

A second solution is to delay the next address phase of a bus cycle for a full clock cycle to allow the external memory or I/O module to deselect the bus. Essentially, this solution is to always insert one or more idle clock cycles before driving an address. A problem with this solution is that it results in a slower implementation and reduced utilization of the bus, thus decreasing the performance of the overall system. Another problem with the foregoing solution is that an idle clock cycle is not required to be inserted after a write bus cycle, since the bus interface unit of the CPU is in control of the timing of the write cycle, and thus knows when the write cycle ends and when it may transmit another address for the next read or write bus cycle.

A third solution is to require acknowledgment cycles after each address and data phase. Again, such a solution requires extra clock cycles, thereby decreasing the performance of the overall computer system.

A fourth solution is to provide for programming of required idle time after all bus cycles during the boot up of the computer system, wherein the bus interface unit is programmed with a specified idle time that pertains to the particular external memory or I/O module coupled to the bus. Such a solution is not practicable for the designer of the CPU when particulars of memory devices and I/O modules to be coupled to the CPU are not known at the time of manufacturing.

As a result of the foregoing, what is needed in the art is a technique for inserting idle clock cycles at appropriate times onto a multiplexed bus in order to alleviate bus contention problems, but not degrade the performance of the bus more than is necessary.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENT

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Figure 1:
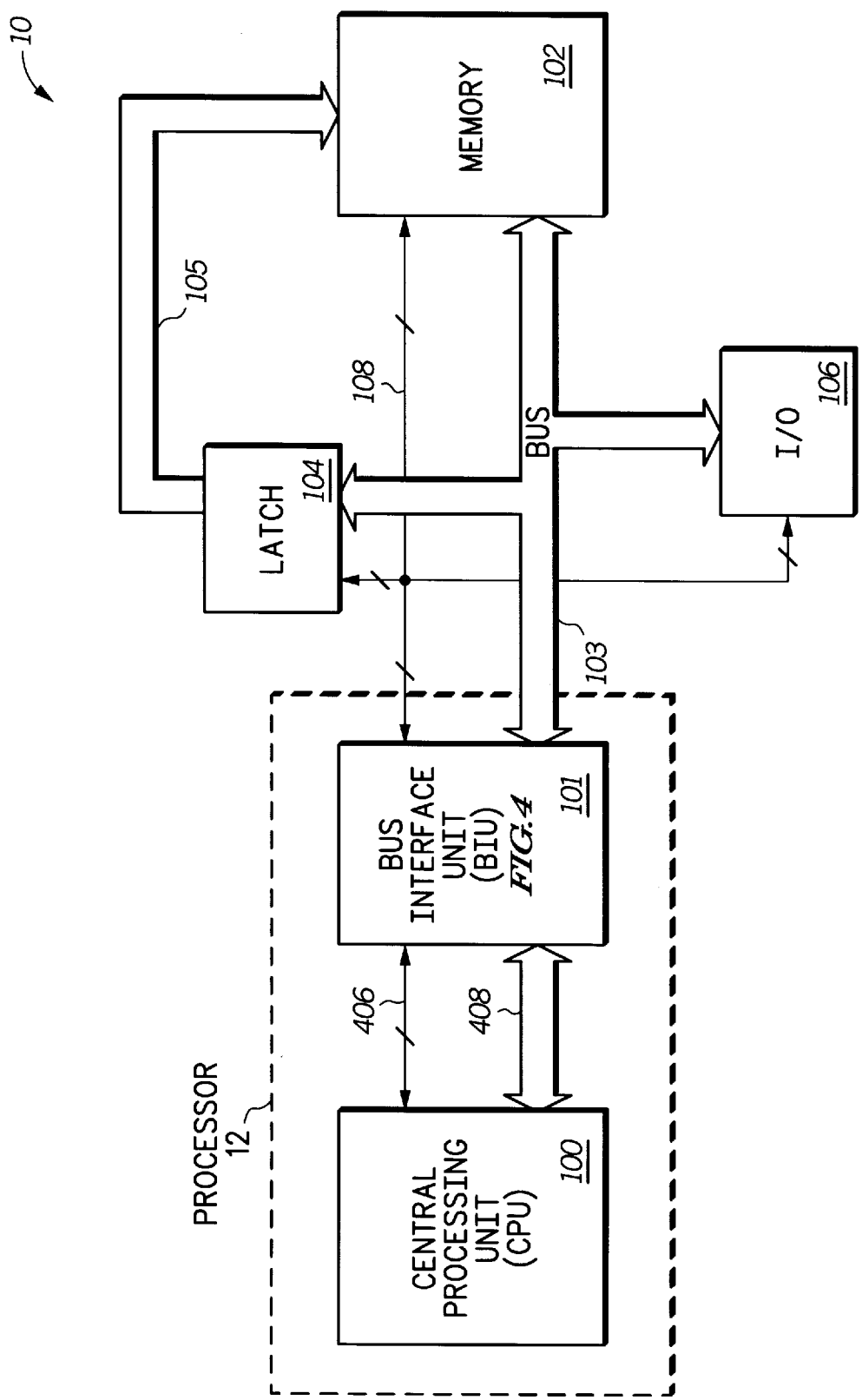
FIG. 1 illustrates a data processing system utilizing a multiplexed bus.

Referring to FIG. 1, there is illustrated data processing (computer) system 10, including processor 12 having CPU 100 coupled to multiplexed bus 103 by bus interface unit ("BIU") 101. Bus 103 couples processor 12 to external memory 102 and I/O module 106. Note, other devices such as display devices, and other types of memory devices could be coupled to processor 12 via bus 103. Furthermore, more than one CPU may be coupled to bus 103. I/O module 106 may represent any type of input/output device operable within a computer system. In one embodiment of the present invention, CPU 100 and BIU 101 are implemented on a same integrated circuit. In alternate embodiments of the present invention, all or any portion of system 10 may be implemented on a same integrated circuit.

Multiplexed bus 103 may comprise any type of system bus that time domain multiplexes address and data.

In one embodiment of the present invention, system 10 is configured so that addresses from processor 12 to memory 102 are provided to memory 102 through latch 104 and bus 105. Such a configuration is not necessary for implementation of the present invention. In alternative embodiments of the present invention, addresses may be driven to memory 102 from processor 12 directly on bus 103.

BIU 101, latch 104, memory 102 and I/O module 106 are also coupled by control line(s) 108, which transfers control signals to/from each of the foregoing devices in a well-known manner.

Figure 4:
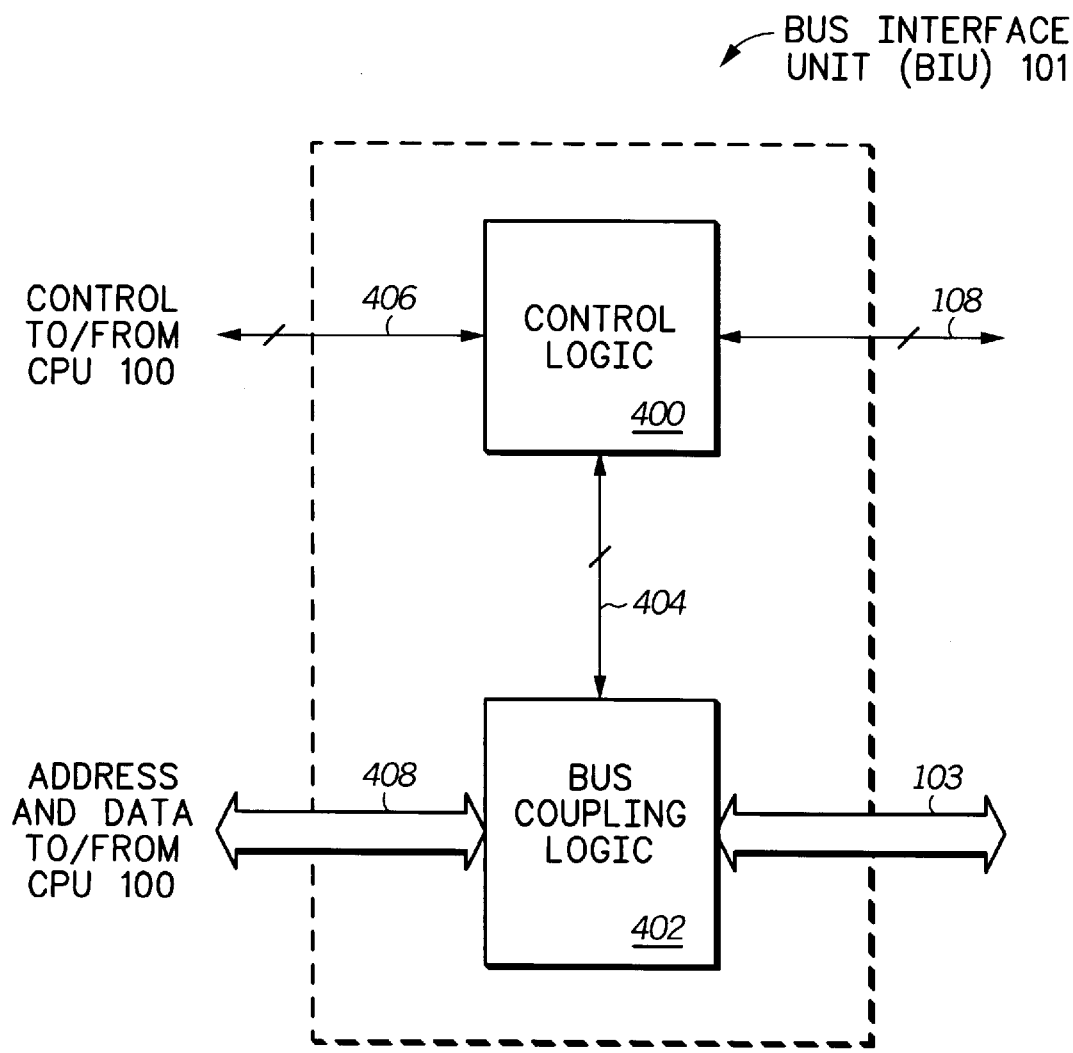
FIG. 4 illustrates a more detailed block diagram of the bus interface unit illustrated in FIG. 1.

Referring to FIG. 4, BIU 101 may comprise circuitry typical within any well-known bus interface unit, and is operable for transferring address, data, and control information to/from CPU 100 to the remainder of system 10. BIU 101 is coupled to CPU 100 by buses 406 and 408. Bus 406 operates to pass control information to/from CPU 100 and BIU 101, while bus 408 operates to pass address and data information between CPU 100 and BIU 101. Bus 408 may or may not multiplex address and data information.

The present invention as described below may be configured as a state machine, as random logic, or as any type of circuitry within BIU 101. Such a state machine, random logic, or other type of circuitry may be implemented within control logic 400 and bus coupling logic 402, which are coupled together by bus 404. Control logic 400 operates to transmit and receive control information on buses 406 and 108 and functions to control the transmission and receipt of address and data information along buses 408 and 103.

Typically, processor 12 will perform operations that require the retrieval of data from either memory 102 or I/O module 106 and will then store data, such as the results of operations, within either memory 102 or I/O module 106. Hereinafter, the discussion will center around the transfer of data to/from processor 12 and memory 102. However, the discussion is valid for the transfer of data to/from processor 12 and I/O module 106.

BIU 101 may be configured in accordance with the present invention within processor 12 during manufacture of processor 12 so that processor 12 can be subsequently coupled to any memory 102 without concern for bus contention problems on bus 103. For example, BIU 101 might be ideally designed so that processor 12 can be purchased or obtained by a user and coupled by the user at a later time with memory 102, and the user will have no concern regarding bus contention problems, which may degrade the performance of system 10.

When processor 12 requests to write data to memory 102, BITU 101 will drive the address of the data to be written to memory 102 onto bus 103. (The address may be transmitted to memory 102 via latch 104 and bus 105.) Thereafter, BIU 101 will drive the data to be stored at that address location onto bus 103 to be received by memory 102. Since BIU 101 has control of bus 103, BIU 101 will have knowledge of exactly when the transfer of data to memory 102, i.e., the write bus cycle, has expired (an acknowledgment signal from memory 102 to BIU 101 may be utilized). BIU 101 may then immediately begin another write bus cycle ("bus cycle" is hereinafter also referred to as an "operation") or a read bus cycle.

However, as briefly discussed above, a bus contention problem may occur subsequent to a read bus cycle. During a read bus cycle, BIU 101 will first transmit an address of the data to be read from memory 102 along bus 103, latch 104 and bus 105 to memory 102. Memory 102 will utilize this address to retrieve the desired data and then transmit that data along bus 103 to BIU 101. After this read operation has been completed, memory 102 must deselect bus 103 and tri-state bus 103 so that BIU 101 can drive the next address onto bus 103. The first problem is that many memory devices such as memory 102 require a considerable amount of time to tri-state bus conductors. Second, if processor 12 is designed and manufactured independently of the remainder of system 10, there is no knowledge as to the deselect period required by memory 102, and thus there is little information for the processor designer when deciding how long to allow for such a time period.

For example, assume a clock period of 30 nanoseconds ("ns"). Also assume that BIU 101 requires a minimum of 10 ns upon receipt of the read data before BIU 101 can again transmit an address for the next read or write operation. Assume further that processor 12 is coupled to a memory device, such as memory 102, that requires a minimum of 20 ns to deselect bus 103, i.e., 20 ns to tri-state bus 103. Under such assumptions, BIU 101 may receive the read data and may wish to initiate another read or write bus cycle 10 ns later. However, at that point in time, memory 102 has not yet deselected bus 103, since it requires at least 20 ns for memory 102 to tri-state bus 103. Under these conditions, both BIU 101 and memory 102 are attempting to control and drive data on bus 103. This may cause a bus contention problem if BIU 101 and memory 102 are trying to drive different data values on the same bus conductors 103.

Under the first solution discussed previously, BIU 101 could be designed to drive the next address on the falling edge of the clock cycle subsequent to the read bus cycle. However, under the above timing assumptions, the falling edge of the clock cycle would occur approximately 15 ns after the read bus cycle, which still results in a bus contention problem, since memory 102 has not yet deselected bus 103, since memory 102 requires 20 ns to tri-state bus 103. If the frequency of bus 103 in system 10 were slower, such a solution might be feasible.

Under the second solution discussed previously, BIU 101 could be designed to wait for one or more clock cycles before driving the next address onto bus 103. In other words, one or more idle clock cycles could be inserted before each time that BIU 101 drives an address onto bus 103. As discussed above, such a solution unnecessarily slows system 10, decreasing its performance.

The third solution discussed above requiring acknowledgment signals for both the address and data phases also requires extra clock cycles, slowing the performance of system 10. Additionally, extra circuitry would have to be implemented.

And, the fourth solution discussed above wherein idle time is inserted in a programmable fashion into the logic of BIU 101 during boot up of system 10 is not feasible for the situation where processor 12 is designed and manufactured independently from the design of memory 102. Additionally, extra circuitry would have to be implemented.

The present invention solves the foregoing problems by delaying bus operations that are back-to-back with a read cycle by forcing at a minimum one idle clock cycle following a read bus cycle. By doing this, the address phase of the next bus cycle can be started immediately following the idle clock cycle(s), giving memory 102 the maximum amount of time for address set-up and for deselecting bus 103. This idle clock cycle(s) is added if there is a back-to-back bus cycle following a read bus cycle and memory 102 or I/O module 106 has not been given enough time to deselect, i.e., an idle clock cycle(s) is only forced when there is not already an idle clock cyde(s) required by BIU 101.

Figure 2:
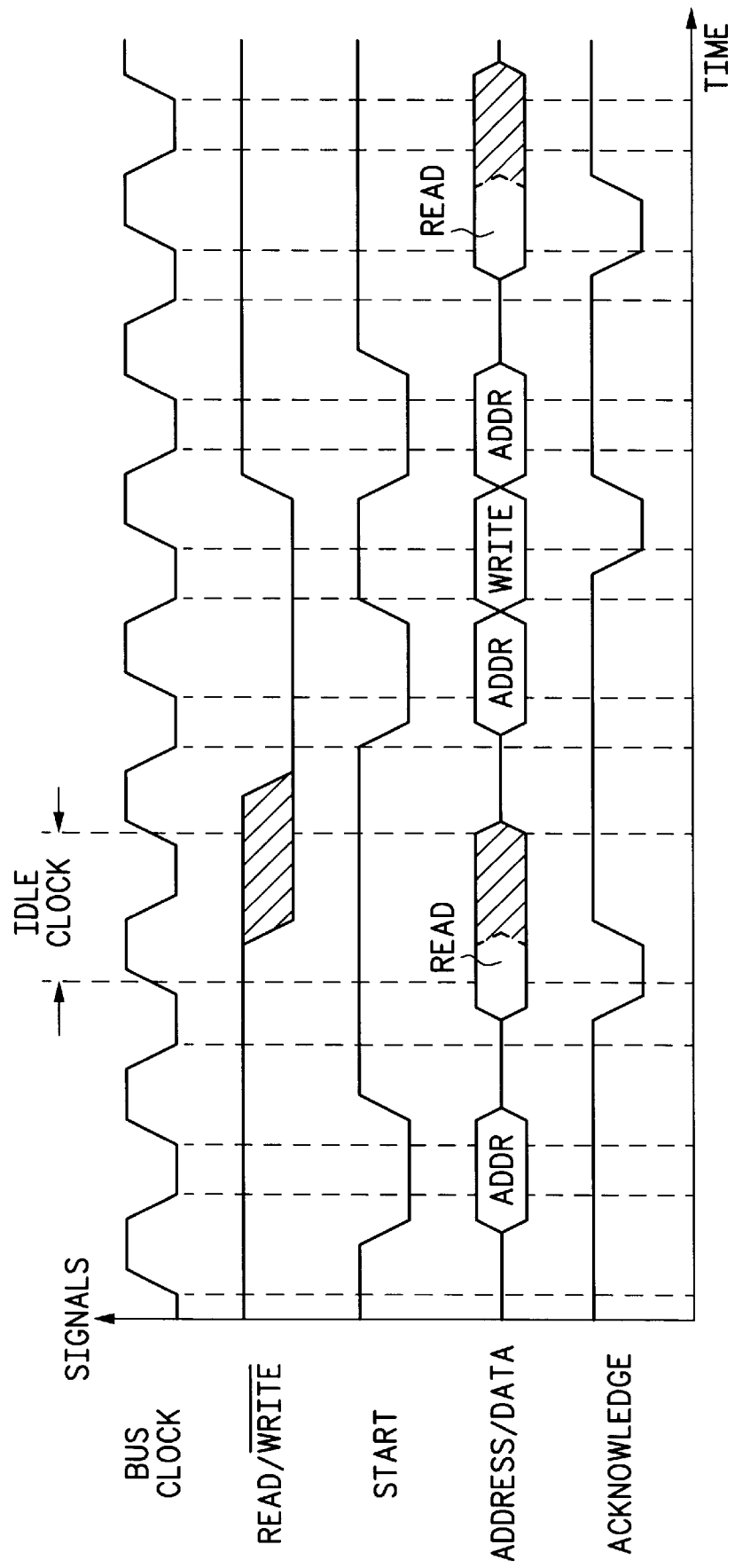
FIG. 2 illustrates a timing diagram wherein an idle clock cycle has been inserted after a read cycle.

Referring next to FIG. 2, there is illustrated a timing diagram showing how an idle clock cycle is placed before the next bus operation is begun following a read operation. The inserted idle clock cycle after the read bus cycle is represented in the timing diagram by the dashed lines within the ADDRESS/DATA stream. When a read cycle is implemented, an address portion is transmitted by BIU 101 onto bus 103 as initiated by the START signal. Subsequently, the read data will be transmitted by memory 102 onto bus 103, and an ACKNOWLEDGE signal received from memory 102 will indicate the successful transmission of the read operation.

Whether a read or write bus cycle is implemented, the START signal initiates the transfer of address information by BIU 101 onto bus 103.

The timing diagram illustrates that BIU 101 will initiate another transfer of address information immediately subsequent to the completion of the transfer of write data. The discussion above describes why this does not result in a bus contention problem.

The bus contention problem described above occurs when a completion of a read bus cycle has occurred and there is a back-to-back bus cycle of another read or write cycle that needs to be performed. Since BIU 101 is not certain of how long it will take memory 102 to deselect bus 103, BIU 101 is uncertain as to when to initiate another START signal for the transfer of the next address information. The solution of the present invention is to insert one or more idle clock cycles after a read operation cycle to allow memory 102 enough time to deselect bus 103. This is indicated by the dashed lines in the ADDRESS/DATA stream in FIG. 2. After the completion of this time, BIU 101 may initiate another transfer of address information for the next bus operation, which is illustrated in FIG. 2 as being a write operation.

Figure 3:
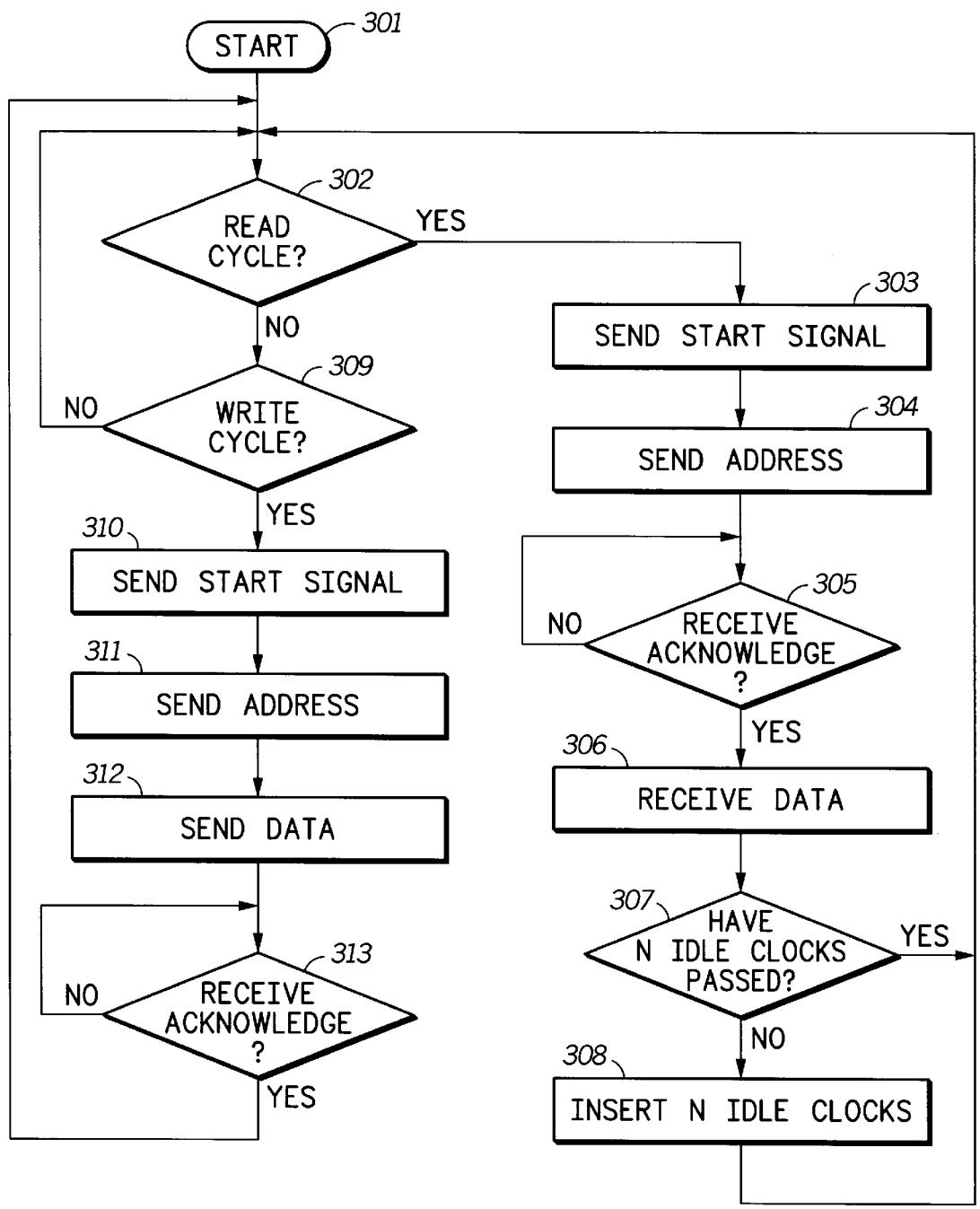
FIG. 3 illustrates a flow diagram configured in accordance with the present invention.

Referring next to FIG. 3, there is illustrated a flow diagram that may be utilized as an implementation of the present invention within BIU 101. The flow diagram of FIG. 3 could be used to design a state machine implemented in control logic 400 and bus coupling logic 402 within BIU 101. One skilled in the art would be able to perform such a design function. Alternate embodiments of the present invention may instead use non-clocked logic (e.g., random logic) to implement part or all of the flow diagram of FIG. 3.

The process begins at step 301 and proceeds to step 302 to determine (monitor) whether or not a read cycle has been initiated by CPU 100. If a read cycle has been initiated, the process proceeds to step 303 to initiate a START signal on bus 108. The process proceeds to step 304 wherein BIU 101 sends address information for the read cycle onto bus 103. This address information may be directly sent to memory 102, or it may be sent to memory 102 by latch 104 and bus 105. In step 305, a loop is entered wherein BIU 101 waits to receive an acknowledgment from memory 102 that the address has been received. Thereafter, in step 306, the read data is received from memory 102.

The process proceeds to step 307 to determine whether or not one or more predetermined N (wherein N is a positive integer) idle clocks have passed since the previous read cycle. This determination is made as to whether or not a sufficient number of idle clocks have passed allowing memory 102 to deselect bus 103. If a sufficient amount of time has passed to allow such a deselect, the process returns to step 302 to wait for a subsequent bus cycle. However, if it is determined in step 307 that there has not been a sufficient amount of time passed to allow for the deselect by memory 102 of bus 103, BIU 101 will insert N (one or more) idle clocks (step 308) into the process so that memory 102 has enough time to enter a tri-state phase, i.e., deselect bus 103. The process after step 308 then returns to step 302 for the next bus cycle.

The number (N) of idle clocks inserted by BIU 101 may be predetermined by the chip designer. Some of the factors that may be considered in determining N are the operating speed of the chip, the operating speed of bus 103, and a statistical average of tri-state times required by various external bus devices.

If in step 302 a read cycle has not been initiated, then in step 309 a determination is made whether or not a write cycle is to be implemented. If not, the process loops back to step 302. However, if a write cycle is enabled in step 309, the process proceeds to step 310 to send a START signal on bus 108 to begin initiation of the write bus cycle. The process then proceeds to step 311 wherein BIU 101 sends the address associated with the data to be written to memory 102.

Thereafter, in step 312, data is written from CPU 100 to memory 102. In step 313, an ACKNOWLEDGE signal is received by BIU 101 on bus 108 acknowledging transfer of the write data to memory 102.

After step 313, the process loops back to step 302.

The above-described invention implemented within BIU 101 monitors for an occurrence of a read operation. Upon such an occurrence, one or more idle bus clocks will be provided into the operation of the system over bus 103 if a back-to-back cycle, whether read or write, is required by CPU 100 subsequent to the monitored read cycle. The idea is to ensure that external devices such as I/O module 106 or memory 102 have enough time to deselect bus 103 after the read bus cycle.

Subsequent to a write bus cycle, the present invention does not insert one or more idle bus clocks, since there is no need to allow for deselect periods by memory 102 or I/O module 106 since BIU 101 is in control of the write bus cycle.

Although the present invention and its advantages have been described in detail, it should be understood that various changes, substitutions and alterations can be made herein without departing from the spirit and scope of the invention as defined by the appended claims.

We claim:

1. A processor adaptable for coupling to a multiplexed bus, said processor comprising:
    a bus interface unit coupled to said processor and adaptable for coupling to said multiplexed bus, said bus interface unit comprising:
        a first circuit adapted to monitor a read operation;

user programmable means for selecting a first time period; and a second circuit adapted to ensure that the first time period has passed subsequent to said read operation before beginning a next bus operation the second circuit comprising:

a third circuit adapted to monitor for a period of no bus operations subsequent to said read operation; and a fourth circuit adapted to insert an idle period subsequent to said read operation when said period of no bus operations does not occur subsequent to said read operation.

2. The processor as recited in claim 1, wherein said monitoring circuitry comprises:

circuitry operable for detecting a receipt of read data.

3. The processor as recited in claim 1, further comprising circuitry operable for initiating said next bus operation subsequent to said idle period.

4. The processor as recited in claim 1, wherein said fourth circuit is operable to insert said idle period only after an occurrence of said read operation.

5. A method for relieving bus contention in a data processing system comprising a processor, said method comprising the steps of:

monitoring bus operations occurring on a multiplexed bus;

determining a first number of idle periods corresponding to a wait time period after read operations;

determining if a first number of idle periods have passed subsequent to a read operation;

selectively inserting idle periods after read operations until the first number of idle periods have passed, wherein the idle periods are inserted after read operations and not after write operations on said multiplexed bus;

monitoring for a period of no bus operations subsequent to said read operation; and inserting said idle periods subsequent to said read operation when said period of no bus operations does not occur subsequent to said read operation.

6. The method as recited in claim 5, further comprising the step of:

monitoring for an occurrence of a read operation.

7. The method as recited in claim 5, wherein during said first number of idle periods no read or write operations are initiated on said multiplexed bus.

8. The method as recited in claim 7, further comprising the step of:

initiating a bus operation after said first number of idle periods, wherein said idle period comprises one or more bus clock periods.

9. The method as recited in claim 8, wherein said step of inserting said idle periods subsequent to said read operation when said period of no bus operations does not occur subsequent to said read operation comprises the step of inserting one or more clock cycles when a write operation or a second read operation is scheduled to be initiated during a bus cycle occurring immediately after said occurrence of said read operation.

10. A data processor comprising:

means for initiating a read operation on a multiplexed bus;

means for sending on said multiplexed bus address information to a peripheral device;

means for receiving data from said peripheral device via said multiplexed bus;

means for determining if a next bus operation has been requested to be initiated immediately subsequent to completion of said read operation;

means for selecting an idle period associated with read operations, where the idle period is not associated with write operations;

means for inserting the idle period on said multiplexed bus immediately subsequent to said completion of said read operation when said next bus operation has been requested by said processor to be initiated immediately subsequent to completion of said read operation;

means for initiating a write operation on said multiplexed bus;

means for sending on said multiplexed bus address information pertaining to said write operation to said peripheral device;

means for sending data associated with said write operation to said peripheral device via said multiplexed bus;

means for determining if a next bus operation has been requested to be initiated immediately subsequent to completion of said write operation; and means for inhibiting insertion of said idle period on said multiplexed bus immediately subsequent to said completion of said write operation when said next bus operation has been requested by said processor to be initiated immediately subsequent to completion of said write operation.

11. The system as recited in claim 10, wherein said next bus operation is a write operation, wherein said processor is writing data to said memory device.

12. The system as recited in claim 10, wherein said next bus operation is a read operation, wherein said processor is reading data from said memory device.

13. The system as recited in claim 10, wherein said idle period is one or more clock cycles, and wherein said idle period allows said memory device to deselect said multiplexed bus.

14. A data processor, the processor comprising:

a central processing unit; and a bus interface unit coupled to the central processing unit, the bus interface unit adaptable for coupling to a multiplexed bus, the bus interface unit comprising:

programmable selection means, the programmable selection means selecting a first wait period associated with a first type of bus operation;

bus coupling circuitry; and control circuitry coupled to the bus coupling circuitry, the control circuitry comprising:

a first monitoring means, the first monitoring means detecting the first type of bus operation;

a second monitoring means, the second monitoring means tracking idle periods inserted after the first type of bus operation;

a third monitoring means adapted to detect a period of no bus operations subsequent to said read operation;

a fourth circuit adapted to insert an idle period subsequent to said read operation when said period of no bus operations does not occur subsequent to said read operation; and wait period insertion means, the wait period insertion means ensuring that the first wait period has passed subsequent to detection of the first type of bus operation before beginning a next bus operation.

15. A data processor as in claim 14, wherein the first wait period is based on the operating frequency of the data processor.

* * * * *